Figure 3:
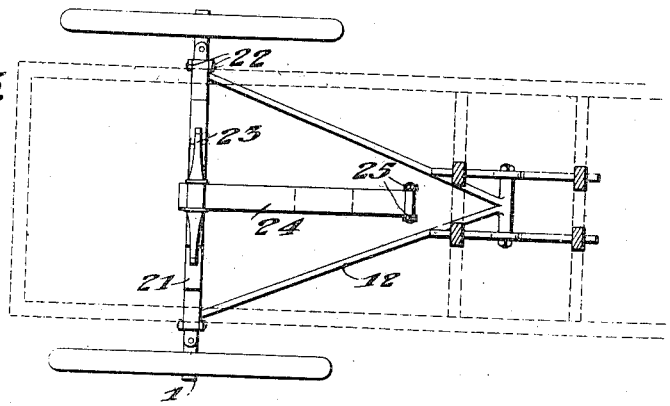

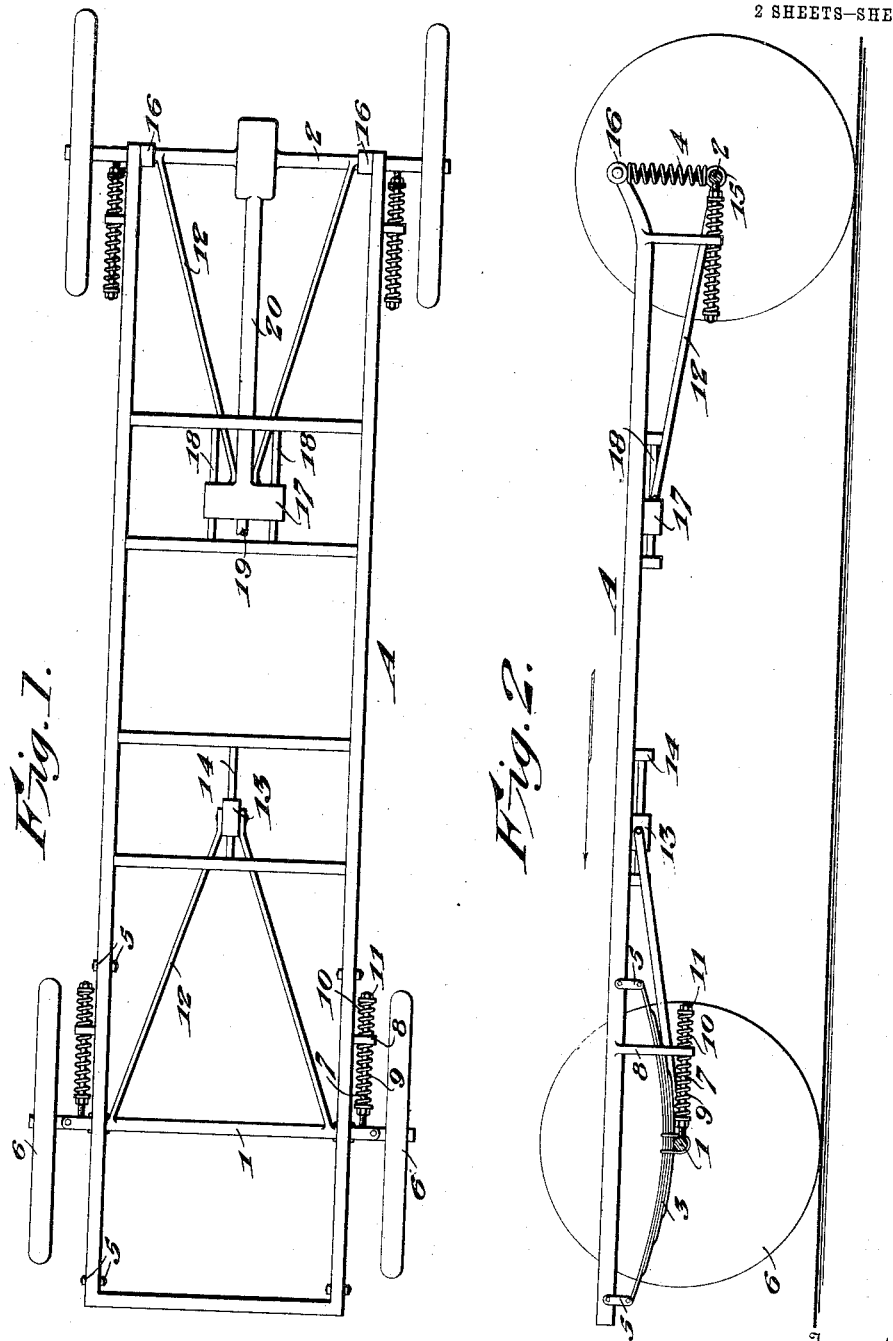

R. S. TROTT.
VEHICLE SPRING.
APPLICATION FILED JULY 20, 1911.

1,029,732.

Patented June 18, 1912.

2 SHEETS—SHEET 2.

Witnesses
Lloyd W. Patch
A. A. Hammond

Inventor
Rolland S. Trott
By Vernon E. Hodge
his Attorney

UNITED STATES PATENT OFFICE.

ROLLAND S. TROTT, OF DENVER, COLORADO.

VEHICLE-SPRING.

1,029,732.  Specification of Letters Patent.  Patented June 18, 1912.

Application filed July 20, 1911. Serial No. 639,625.

*To all whom it may concern:*

Be it known that I, ROLLAND S. TROTT, a citizen of the United States, residing at Denver, in the county of Denver and State of Colorado, have invented certain new and useful Improvements in Vehicle-Springs, of which the following is a specification.

My invention relates to an improvement in vehicle springs, and the object is to provide a spring suspension which will receive the vertical shock, and at the same time absorb endwise shock, and further to provide means whereby the axle is held in a position approximately at right angles to the line of draft. It has been found that the greatest jar to a vehicle is caused by the endwise shock as the wheels hit the inequalities of the road over which it is traveling, and it is the purpose of my invention to provide means to lessen this endwise shock.

The invention still further consists in certain novel features of construction and combinations of parts which will be hereinafter fully described and pointed out in the claims.

In the accompanying drawing:—Figure 1 is a top plan view of the frame of a vehicle with my invention applied thereto, Fig. 2 is a view in side elevation, but with the wheels on the one side removed, and Figs. 3, 4, 5, and 6 show different modifications which might be made in the form of the spring and yet accomplish my invention.

A. represents the frame of the vehicle, and 1 and 2 are the front and rear axles respectively. In my preferred form, as shown in Figs. 1 and 2, I have provided a semi-elliptic leaf spring 3 to absorb the vertical shock upon the front axle, while on the rear axle I have provided a spiral spring 4. Spring 3 is connected to the frame by links 5, 5, which give the necessary pivotal movement as the axle 1 is moved in either direction, due to any resistance against the front wheels 6, 6. The rod 7 which is secured to the shaft 1 is slidably secured in the arm 8 which is a part of the frame; and received around the rod and between the axle and the arm is a spiral shock spring 9. A re-bound spring 10 is received around the rod between the arm and the adjusting nut 11. A practically V-shaped brace 12 is secured to the axle at its wide end, and at its other end is provided with a socket 13, which is adapted to slide loosely upon the rod 14 which is carried by the under side of the frame. The brace, shock, and rebound springs are substantially the same upon the rear axle as upon the front, but the spring connection is formed in a slightly different manner. A socket 15 is mounted upon the axle 2, and a similar socket 16 is pivotally mounted upon the frame in a practically vertical plane therewith, and a spring 4 is received between these two sockets. The pivotal movement of the spring 4, due to endwise movement of the axle 2 would be accommodated by socket 16. It may be necessary to form, upon the rear axle, a cross-head 17 which is slidably mounted upon rods 18 secured below the frame, and to pass the drive shaft 19 from the engine through the center of the cross-head and down through the shaft-housing 20 to the driving mechanism carried by shaft 2.

In the form shown in Fig. 3, I have provided a semi-elliptical leaf spring 21, which is connected to the axle 1 at its ends by links 22, 22, and is in a parallel vertical plane therewith. The structure is pivoted to the frame 23, and endwise shock is absorbed by a rectilinear leaf spring 24, which is connected to the frame, at its outer end, by links 25, 25. A brace 12 is provided in this structure to keep the alinement of the axle.

Figure 4:
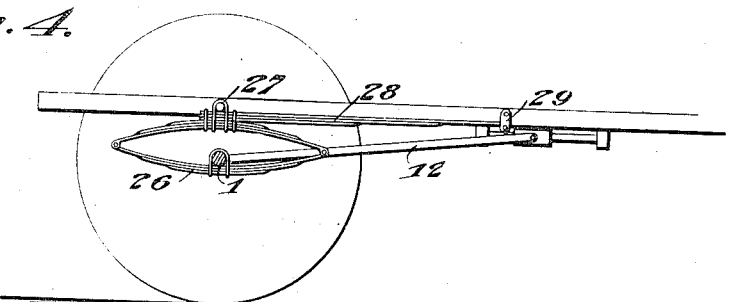

In Fig. 4, I have provided an elliptic spring 26 which is connected to axle 2 at its lower side, and is pivotally connected to the frame at 27 on its upper side. A leaf spring 28, similar to that shown in Fig. 3, is connected to the spring 26 at its point of pivot, and at its outer end to the frame by links 29.

Figure 5:
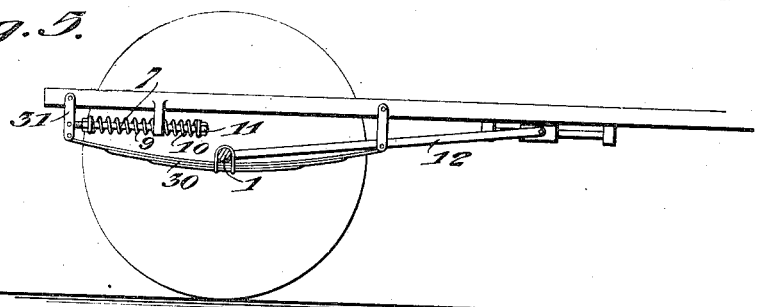

In the form shown in Fig. 5, a vertical shock spring 30, similar to that shown in Fig. 1, is connected to the axle 2, and the shock and rebound springs are of the same structure but have been moved to a position between the spring frame, so that the rod 7 may be pivotally connected to the forward link 31 provided for the suspension of spring 30.

Figure 6:
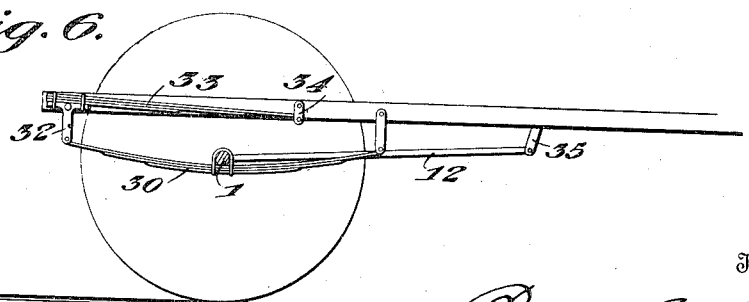

In Fig. 6, the vertical shock spring is the same as that shown in Fig. 5, but the forward link 32 of the suspension is made T-shaped, and has connected thereto a rectilinear endwise shock spring 33, similar to that shown in Figs. 3 and 4, which is connected to the frame at its outer end by links 34. In the form shown in Fig. 6, I have also disclosed another means, wherein the brace 12 is pivoted to a link 35 which is in turn pivotally connected to the frame, for maintaining the alinement of the axle.

In this way, it will be seen that I have provided a spring suspension which materially lessens the jar imparted to a vehicle by the inequalities of the road, and which at the same time does not greatly increase the cost nor materially change the structure of the other parts of the vehicle.

Having fully described my invention, what I claim as new and desire to secure by Letters Patent, is:—

1. The combination with a vehicle frame of an axle, springs each connected to said frame and axle in such a manner that they absorb the vertical and longitudinal shock, and means secured to the axle for holding it in a position at right angles to the line of draft.

2. The combination with a vehicle frame, of an axle, springs each connected to said frame and axle in such a manner that they resiliently oppose vertical or horizontal movement of the axle, and means connected with the axle and frame for holding the axle in a position at right angles to the line of draft.

3. The combination with a vehicle frame, of an axle, load springs mounted between the frame and axle in such a manner that they absorb the vertical shock, endwise shock springs connected to the axle and frame in such a manner that they absorb the longitudinal shock, and a brace secured to the axle and connected with the frame for holding the axle in a position at right angles to the line of draft.

4. The combination with a vehicle frame, of an axle, load springs mounted between the frame and axle in such a manner that they absorb the vertical shock, endwise shock springs connected to the axle and frame in such a manner that they absorb the longitudinal shock, and a V-shaped brace secured to the axle near the extremities thereof and slidably connected to the frame at its other end.

5. The combination with a vehicle frame, of an axle, a spring interposed between the axle and a point of pivot on said frame to receive the vertical shock, a rectilinear spring connected at one end with the axle spring and at its opposite end with the frame, whereby to receive the endwise shock, and means for holding the axle in a position at right angles to the line of draft.

6. The combination with a vehicle frame, of an axle, a spring interposed between the axle and a point of pivot on said frame to receive the vertical shock, a rectilinear spring connected at one end with the axle spring and at its opposite end with the frame, whereby to receive the endwise shock, and a V-shaped brace secured to the axle near the extremities thereof and slidably connected to the frame at its other end.

7. The combination with a vehicle frame, of an axle, a spring interposed between the axle and a point of pivot on said frame to receive the vertical shock, a rectilinear spring connected at one end to the axle spring and at its opposite end with the frame, whereby to receive the endwise shock, a V-shaped brace having the ends thereof secured to the axle near its extremities, and a rod mounted longitudinally on the frame with which the inner end of the brace has a sliding connection.

8. The combination with a vehicle frame, of an axle, a spring interposed between the axle and a point of pivot on said frame, a second spring connected to said frame and axle adapted to resiliently oppose pivotal movement of the axle about said pivot, and a brace secured to the axle and connected with the frame for holding the axle at right angles to the line of draft.

9. The combination with a vehicle frame, of an axle, load springs mounted between the frame and axle to resiliently oppose the vertical shock, endwise shock springs connected to the frame and axle to resiliently oppose the endwise shock, and a brace secured to the axle and connected with the frame for holding the axle in a position at right angles to the line of draft.

In testimony whereof I affix my signature, in the presence of two witnesses.

ROLLAND S. TROTT.

Witnesses:
JAMES R. KILLIAN,
JAMES PERCHARD.